United States Patent
Chen et al.

(10) Patent No.: US 6,965,760 B1
(45) Date of Patent: Nov. 15, 2005

(54) SATELLITE-BASED LOCATION SYSTEM EMPLOYING DYNAMIC INTEGRATION TECHNIQUES

(75) Inventors: Byron Hua Chen, Whippany, NJ (US); Tung Ching Chiang, Berkeley Heights, NJ (US); Ren Da, Basking Ridge, NJ (US); Ibrahim Tekin, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/391,123

(22) Filed: Sep. 7, 1999

(51) Int. Cl.[7] .............................................. H04B 17/00
(52) U.S. Cl. .................... 455/226.1; 455/427; 455/456; 455/67.1; 342/357.06
(58) Field of Search ............................... 455/427, 12.1, 455/456, 457, 226.1, 67.1, 67.6; 342/357.06, 357.07, 357.08, 357.09, 357.1, 357.11, 357.12, 356

(56) References Cited

U.S. PATENT DOCUMENTS

| | | | | |
|---|---|---|---|---|
| 5,576,715 A | * | 11/1996 | Litton et al. ........... | 342/357.12 |
| 5,805,200 A | * | 9/1998 | Counselman, III ..... | 342/357.08 |
| 6,075,987 A | * | 6/2000 | Cap, Jr. et al. ............. | 455/427 |
| 6,298,083 B1 | * | 10/2001 | Westcott et al. ............ | 375/150 |
| 6,313,789 B1 | * | 11/2001 | Zhodzishsky et al. . | 342/357.12 |
| 6,490,265 B1 | | 12/2002 | Sasaki et al. ................ | 370/342 |

FOREIGN PATENT DOCUMENTS

| JP | 11 186987 | 10/1999 | ............ H04J/13/00 |
|---|---|---|---|
| WO | WO 95/14937 | 6/1995 | ........... H04B/1/707 |
| WO | WO 98/02759 | 1/1998 | ........... H04B/1/707 |
| WO | WO 98/25157 | 6/1998 | ........... H04B/7/185 |

OTHER PUBLICATIONS

European Search Report.

* cited by examiner

*Primary Examiner*—Edward F. Urban
(74) *Attorney, Agent, or Firm*—Jimmy Goo

(57) ABSTRACT

A method and apparatus for facilitating detection of satellite signals using a dynamic integration technique in which integration time periods of correlators are adjusted according to signal strength measurements of satellite signals received at GPS receivers. Specifically, integration time periods are inversely adjusted, either proportionally or non-proportionally, to received strengths of signals being searched.

13 Claims, 7 Drawing Sheets

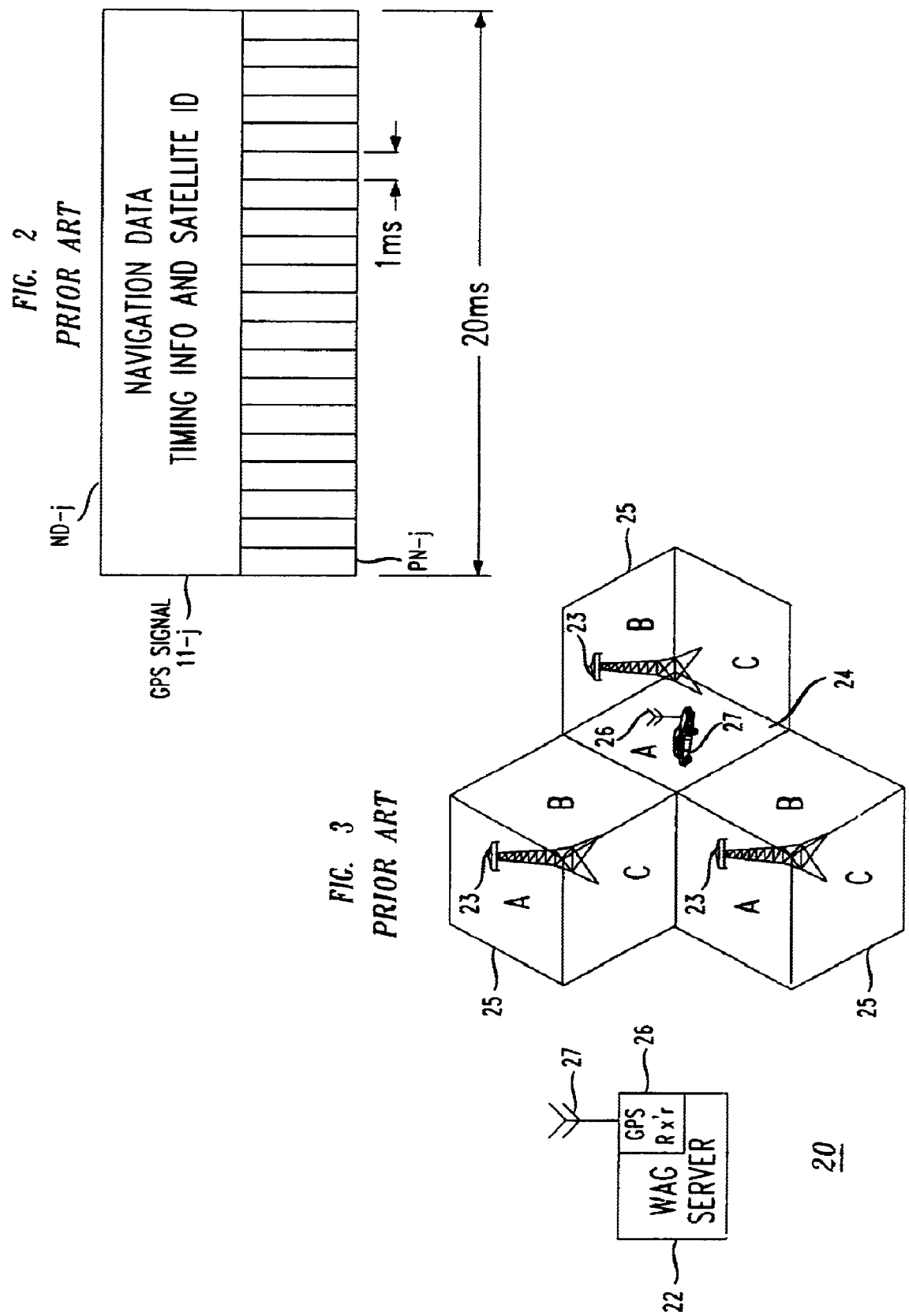

SATELLITE-BASED LOCATION SYSTEM EMPLOYING DYNAMIC INTEGRATION TECHNIQUES

RELATED APPLICATIONS

Related subject matter is disclosed in the following applications and assigned to the same Assignee hereof: U.S. patent application Ser. No. 08/927,434 entitled "An Auxiliary System For Assisting A Wireless Terminal In Determining Its Position From Signals Transmitted From A Navigation Satellite," inventors Robert Ellis Richton and Giovanni Vannucci; U.S. patent application Ser. No. 08/927,432 entitled "Telecommunications Assisted Satellite Positioning System," inventors Giovanni Vannucci; U.S. patent application Ser. No. 09/321,075 entitled "Wireless Assisted GPS Using A Reference Location," inventors Robert Ellis Richton and Giovanni Vannucci; and U.S. patent application Ser. No. 60/114,491 entitled "Wireless Assisted Satellite Location Using a Reference Point," inventors Robert Ellis Richton and Giovanni Vannucci. Related subject matter is disclosed in the following application filed concurrently herewith and assigned to the same Assignee hereof: U.S. patent application entitled "Satellite-Based Location System Employing Knowledge-Based Sequential Signal Search Strategy", Ser. No. 09392,765, inventors Ren Da and Giovanni Vannucci.

1. Field of the Invention

The present invention relates generally to wireless communication systems and, in particular, to satellite-based location systems.

2. Background of the Related Art

Satellite-based navigational systems provide accurate, three dimensional position information to worldwide users. Prior art satellite-based navigational systems, however, utilize a time consuming search process for determining position information. Time consuming search processes are undesirable in navigational systems particularly when the user is moving or in an emergency situation requiring immediate assistance.

FIG. 1 depicts a well-known satellite-based navigational system referred to as Global Positioning System (GPS) 10. GPS 10 comprises a plurality of satellites 12-$j$ and at least one GPS receiver 14, where j=1, 2, ..., n. Each satellite 12-$j$ orbiting earth at a known speed $v_j$ and being a known distance apart from the other satellites 12-$j$. Each satellite 12-$j$ transmits a GPS signal 11-$j$ which includes a carrier signal with a known frequency f modulated using a unique pseudo-random noise (PN-j) code and navigational data s(ND-) associated with the particular satellite 12-$j$, wherein the PN-j code includes a unique sequence of PN chips and navigation data ND-j includes a satellite identifier, timing information and orbital data, such as elevation angle $\alpha_j$ and azimuth angle $\phi_j$. FIG. 2 depicts a typical 20 ms frame of the GPS signal 11-$j$ which comprises twenty full sequences of a PN-j code in addition to a sequence of navigation data ND-j.

GPS receiver 14 comprises an antenna 15 for receiving GPS signals 11-$j$, a plurality of correlators 16-$k$ for detecting GPS signals 11-$j$ and a processor 17 having software for determining a position using the navigation data ND-j, where k=1, 2, ..., m. GPS receiver 14 detects GPS signals 11-$j$ via PN-j codes. Detecting GPS signals 12-$j$ involves a correlation process wherein correlators 16-$k$ are used to search for PN-j codes in a carrier frequency dimension and a code phase dimension. Such correlation process is implemented as a real-time multiplication of a phase shifted replicated PN-j codes modulated onto a replicated carrier signal with the received GPS signals 11-$j$, followed by an integration and dump process.

In the carrier frequency dimension, GPS receiver 14 replicates carrier signals to match the frequencies of the GPS signals 11-$j$ as they arrive at GPS receiver 14. However, due to the Doppler effect, the frequency f at which GPS signals 11-$j$ are transmitted changes an unknown amount $\Delta f_j$ before GPS signal 11-$j$ arrives at GPS receiver 14—that is, each GPS signal 11-$j$ should have a frequency $f+\Delta f_j$ when it arrives at GPS receiver 14. To account for the Doppler effect, GPS receiver 14 replicates the carrier signals across a frequency spectrum $f_{spec}$ ranging from $f+\Delta f_{min}$ to $f+\Delta f_{max}$ until the frequency of the replicated carrier signal matches the frequency of the received GPS signal 11-$j$, wherein $\Delta f_{min}$ and $\Delta f_{max}$ are a minimum and maximum change in frequency GPS signals 11-$j$ will undergo due to the Doppler effect as they travel from satellites 12-$j$ to GPS receiver 14, i.e., $\Delta f_{min} < \Delta f_j < \Delta f_{max}$.

In the code phase dimension, GPS receiver 14 replicates the unique PN-j codes associated with each satellite 12-$j$. The phases of the replicated PN-j codes are shifted across code phase spectrums $R_j(spec)$ until replicated carrier signals modulated with the replicated PN-j codes correlate, if at all, with GPS signals 11-$j$ being received by GPS receiver 14, wherein each code phase spectrum $R_j(spec)$ includes every possible phase shift for the associated PN-j code. When GPS signals 11-$j$ are detected by correlators 16-$k$, GPS receiver 14 extracts the navigation data ND-j from the detected GPS signals 11-$j$ and uses the navigation data ND-j to determine a location for GPS receiver 14, as is well-known in the art.

Correlators 16-$k$ are configured to perform parallel searches for a plurality of PN-j codes across the frequency spectrum $f_{spec}$ and the code phase spectrums $R_j(spec)$. In other words, each of the plurality of correlators 16-$k$ are dedicated to searching for a particular PN-j code across each possible frequency between $f+\Delta f_{min}$ to $f+\Delta f_{max}$ and each possible for that PN-j code. When a correlator 16-$k$ completes its search for a PN-j code, the correlator 16-$k$ searches for another PN-j code across each possible frequency between $f+\Delta f_{min}$ to $f+\Delta f_{max}$ and each possible phase shift for that PN-j code. This process continues until all PN-j codes are collectively searched for by the plurality of correlators 16-$k$. For example, suppose there are twelve satellites 12-$j$, thus there would be twelve unique PN-j codes. If GPS receiver 14 has six correlators 16-$k$, then GPS receiver 14 would use its correlators 16-$k$ to search for two sets of six different PN-j codes at a time. Specifically, correlators 16-$k$ search for the first six PN-j codes, i.e., correlator 16-1 searches for PN-1, correlator 16-2 searches for PN-2, etc. Upon completing the search for the first six PN-j codes, correlators 16-$k$ search for the next six PN-j codes, i.e., correlator 16-1 searches for PN-7, correlator 16-2 searches for PN-8, etc.

For each PN-j code being searched, correlator 16-$k$ performs an integration and dump process for each combination of frequency and phase shifts for that PN-j code. For example, suppose the frequency spectrum $f_{spec}$ includes 50 possible frequencies for the carrier signal and the code phase spectrum $R_j(spec)$ for a PN-j code includes 2,046 possible half-chip phase shifts. To search for every possible combination of frequency and half-chip phase shifts for the PN-j code, the correlator 16-$k$ would then need to perform 102,300 integrations. A typical integration time for correlators 16-$k$ is 1 ms, which is generally sufficient for GPS receiver 14 to detect GPS signals 11-$j$ when antenna 15 has a clear view of the sky or a direct lie-of-sight to satellites 12-j. Thus, for the above example, 102.3 seconds would be required for one correlator 16-k to search every possible combination of frequency and half-chip phase shifts for a PN-j code.

GPS receivers, however, are now being incorporated into mobile-telephones or other types of mobile communication devices which do not always have a clear view of the sky. Thus, GPS receiver 14 will not always have a clear view of the sky. In this situation, the signal-to-noise ratios of GPS signals 11-j received by GPS receiver 14 are typically much lower than when GPS receiver 14 does have a clear view of the sky, thus making it more difficult for GPS receiver 14 to detect the GPS signals 11-j. To compensate for weaker signal-to-noise ratios and enhance detection of GPS signals 11-j, correlators 16-k can be configured with longer integration times. In other words, detection is more accurate with longer integration times. A sufficient integration time, in this case, would be approximately 1 second. Thus, for the example above, 102,300 seconds would be required for a correlator 16-k to search for every possible combination of frequency and half-chip phase shifts for a PN-j code. Longer integration times result in longer acquisition times for detecting GPS signals 11-j. Longer acquisition times are undesirable.

Wireless assisted GPS (WAG) systems were developed to facilitate detection of GPS signals 11-j by GPS receivers configured with short or long integration times. The WAG system facilitates detection of GPS signals 11-j by reducing the number of integrations to be performed by correlators searching for GPS signals 11-j. The number of integrations is reduced by narrowing the frequency range and code phase ranges to be searched. Specifically, the WAG system limits the search for GPS signals 11-j to a specific frequency or frequencies and to a range of code phases less than the code phase spectrum $R_j(spec)$.

FIG. 3 depicts a WAG system 20 comprising a WAG server 22, a plurality of base stations 23 and at least one WAG client 24. WAG server 22 includes a GPS receiver 26 having an antenna 27 installed in a known stationary location with a clear view of the sky. GPS receiver 26 would typically have correlators configured with short integration times because antenna 27 has a clear view of the sky. WAG server 22 being operable to communicate with base stations 23 either via a wired or wireless interface. Each base station 23 has a known location and provides communication services to WAG clients located within a geographical area or cell 25 associated with the base station 23, wherein each cell 25 is a known size and is divided into a plurality of sectors. WAG client 24 includes a GPS receiver 28 and perhaps a mobile-telephone 27, and is typically in motion and/or in an unknown location with or without a clear view of the sky. GPS receiver 28 having correlators typically configured with long integration times. Note that the term "mobile-telephone," for purposes of this application, shall be construed to include, but is not limited to, any communication device.

FIG. 4 is a flowchart 300 illustrating the operation of WAG system 20. In step 310, WAG server 22 detects a plurality of satellites 12-j via their GPS signals 11-j using its GPS receiver 26. WAG server 22 acquires the following information from each detected satellite 12-j: the identity of satellite 12-j and frequency $f_j$, code phase, elevation angle $\alpha_j$ and azimuth angle $\phi_j$ associated with the detected satellite 12-j, wherein the elevation angle $\alpha_j$ is defined as the angle between the line of sight from WAG server 22 or client 24 to a satellite 12-j and a projection of the line of sight on the horizontal plane, and the azimuth angle $\phi_j$ is defined as the angle between the projection of the line of sight on the horizontal plane and a projection of the north direction on the horizontal plane. See FIG. 5, which depicts an elevation angle $\alpha_j$ and an azimuth angle $\phi_j$ corresponding to a satellite 12-j and a WAG server 22 or WAG client 24.

In step 315, WAG server 22 receives sector information from base station 23 currently in communication with or serving WAG client 24, wherein the sector information indicates a sector WAG client 24 is currently located. In step 320, WAG server 22 makes an initial estimate of WAG client's position based on the known location of the serving base station, the cell size associated with the serving base station, and the sector in which WAG client 24 is currently located. In one embodiment, WAG server 22 initially estimates that WAG client 24 is located at a reference point within the sector, e.g., point at approximate center of sector. In another embodiment, WAG server 22 initially estimates WAG client 24's position using well-known forward link triangulation techniques.

In step 330, for each detected satellite 12-j, WAG server 22 uses the information acquired from the detected GPS signals 11-j to predict a frequency $f_j(r)$ at the reference point and a code phase search range $R_j(sect)$ which includes all possible code phases for GPS signal 11-j arriving anywhere within the sector where WAG client 24 is currently located. In step 340, WAG server 22 transmits a search message to the serving base station 23, wherein the search message includes, for each detected satellite 12-j, information re g the associated PN-j code, predicted frequency $f_j(r)$ and code phase search range $R_j(sect)$.

In step 350, serving base station 23 transmits the search message to WAG client 24 which, in step 360, begins a parallel search for the satellites 12-j indicated in the search message. Specifically, WAG client 24 will use its correlators to simultaneously search for each of the GPS signals 11-j at the predicted frequency $f_j(r)$ within the limitations of the code phase search range $R_j(sect)$ indicated in the search message. Thus, the number of integrations is reduced to the predicted frequency $f_j(r)$ within the limitations of the code phase search range $R_j(sect)$. However, due to the long integration times of GPS receiver 28 in WAG client 24, the search time is still considered time consuming. Accordingly, there exists a need to facilitate detection of satellites 12-j.

SUMMARY OF THE INVENTION

The present invention is a method and apparatus for facilitating detection of satellite signals using a dynamic integration technique. The present invention uses a dynamic integration technique in which integration time periods of correlators are adjusted according to signal strength measurements of satellite signals received at GPS receivers. Specifically, integration time periods are inversely adjusted, either proportionally or non-proportionally, to received strengths of signals being searched. In one embodiment, when received signal strengths are above or equal to a threshold value, the integration time period is short, e.g., 1 millisecond. By contrast, when received signal strengths are below the threshold value, the integration time period is long, e.g., 1 second. For example, when WAG client is indoors and the satellite signals are weak, the integration time period is 1 second, and when WAG client is outdoors and the satellite signals are strong, the integration time period is 1 millisecond. Advantageously, because the integration time periods are dynamically and inversely adjusted according to received signal strengths of satellite signals, detection of satellite signals is facilitated without sacrificing accuracy of detection. To further facilitate detection, one embodiment uses a sequential search technique during which satellites are searched for in a sequential manner based on knowledge acquired from detecting other satellite signals.

BRIEF DESCRIPTION OF THE DRAWINGS

The features, aspects, and advantages of the present invention will become better understood with regard to the following description, appended claims, and accompanying drawings where

FIG. 2 depicts a typical 20 ms frame of a GPS signal;

FIG. 3 depicts a Wireless Assisted GPS (WAG) system;

DETAILED DESCRIPTION

The present invention is described herein with reference to the aforementioned WAG system. This should not be construed, however, to limit the present invention in any manner.

Figure 1:
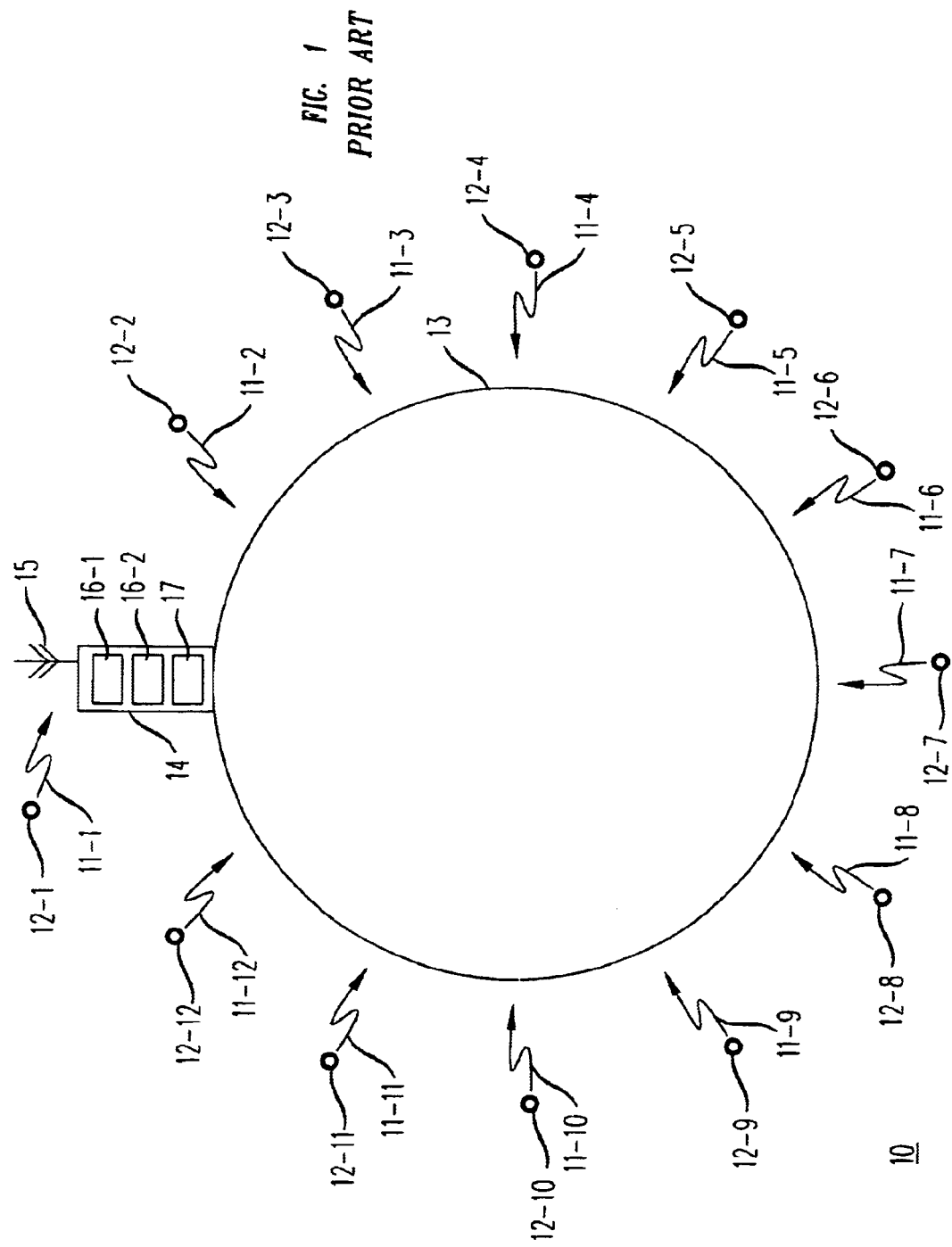
FIG. 1 depicts a well-known satellite-based navigational system referred to as Global Positioning System (GPS)
Figure 4:
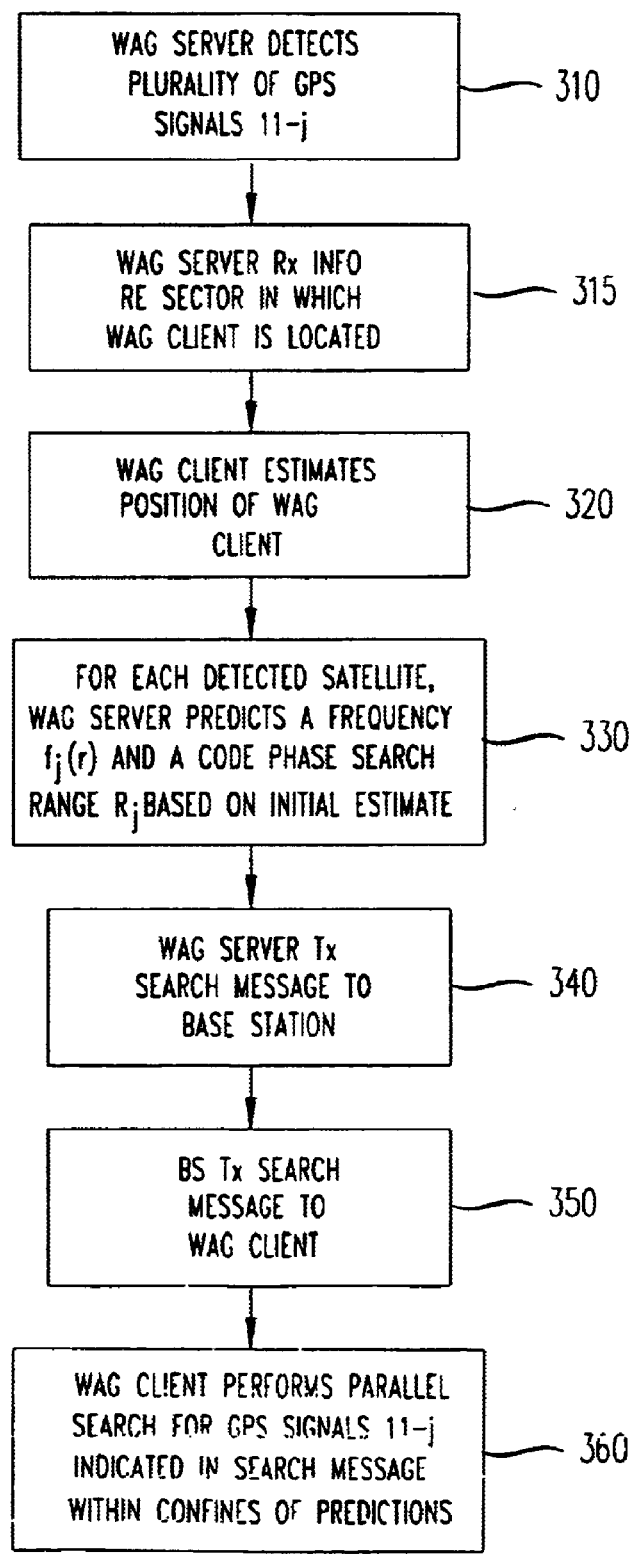
FIG. 4 depicts a flowchart illustrating the operation of the WAG system of FIG. 3.
Figure 5:
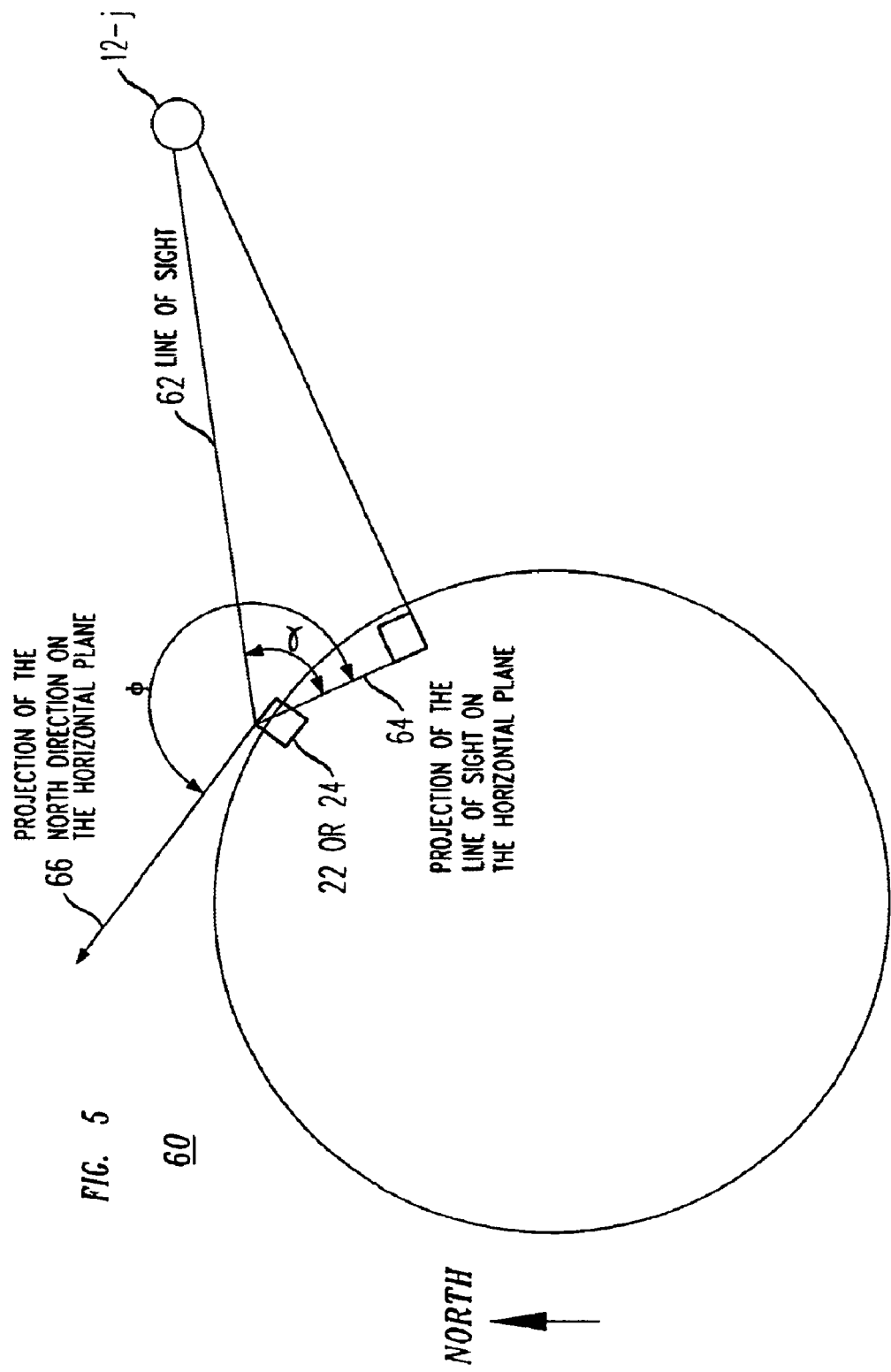
FIG. 5 depicts an elevation angle $\alpha_j$ and an azimuth angle $\phi_j$ corresponding to a satellite and a WAG server or WAG client.
Figure 6:
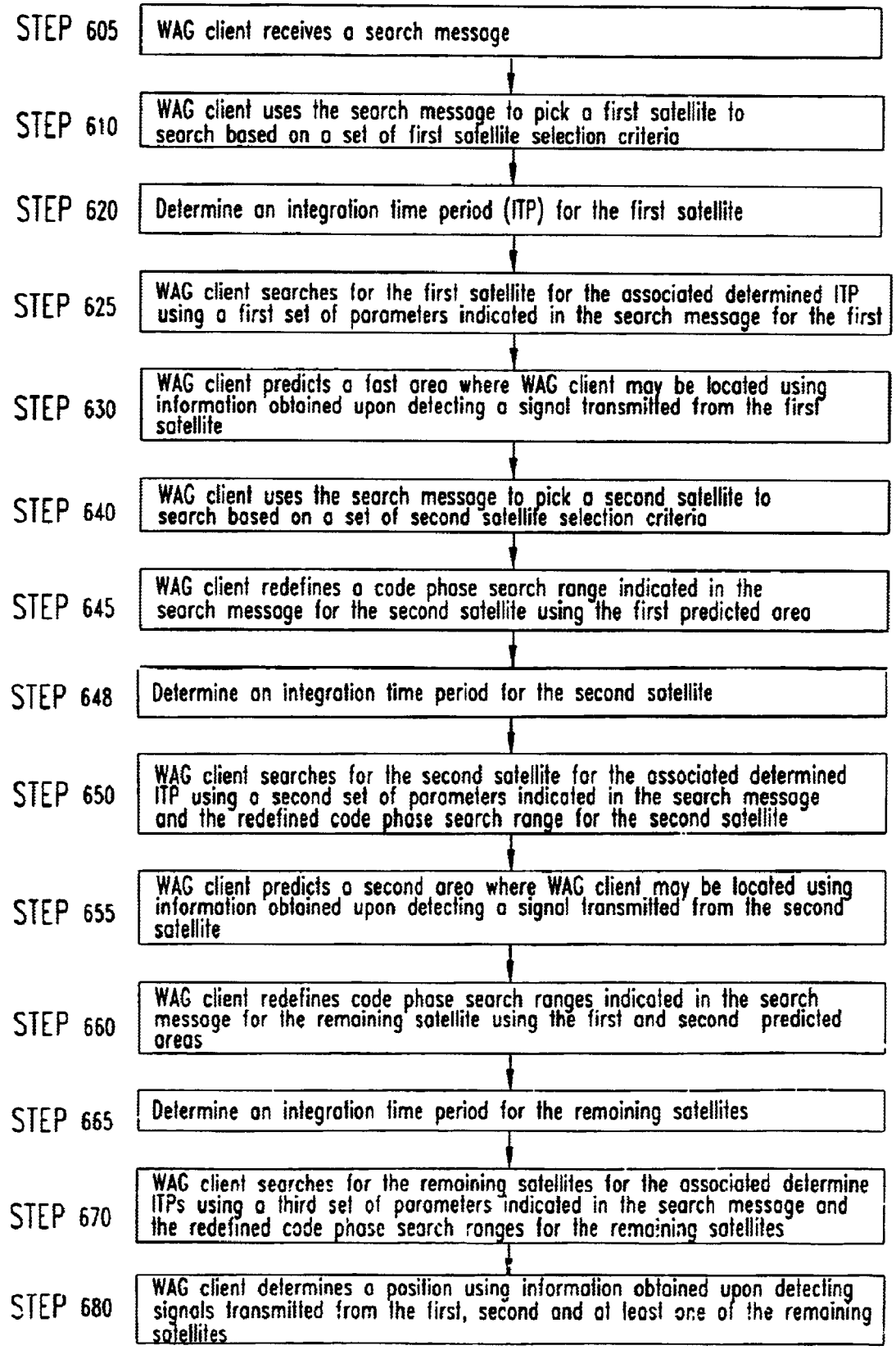
FIG. 6 depicts a flowchart illustrating a sequential search technique and dynamic integration technique used in accordance with one embodiment of the present invention.

FIG. 6 is a flowchart 600 illustrating a sequential search technique used in accordance with one embodiment of the present invention. In step 605, WAG client 24 receives a search message from its serving base station 23 or WAG server 22. In the present invention, the search message includes, for each satellite $12_j$ detected by WAG server 22, information regarding the associated PN-j code, predicted frequency $f_j(r)$ at a reference point within the sector/cell where WAG client 24 is currently located, code phase search range $R_j$(sect) including all possible phase shifts for a GPS signal 11-j transmitted by satellite 12-j and arriving within the sector/cell where WAG client 24 is currently located, and orbital data including elevation angle $\alpha_j$ and azimuth angle $\phi_j$.

In step 610, WAG client 24 selects a first satellite 12-j indicated in the search message to search. WAG client 24 uses one or more criteria in a set of first satellite selection criteria to select the first satellite 12-j. In one embodiment, the set of first satellite selection criteria are as follows: (1) maximize utilization of correlators; (2) minimize search time; and (3) maximize the amount of information regarding location of WAG client 24 (or GPS receiver 14 or antenna 15 ). The first criteria of maximizing utilization of correlators involves using as many of the available correlators to simultaneously search for a satellite 12-j. The second criteria of minimizing search time involves reducing the number of integrations to be performed by each correlator, e.g., each correlator performs one integration. Reducing the number of integrations to be performed by each correlator essentially means selecting a satellite 12-j having the smallest associated code phase search range $R_j$ indicated in the search message.

The third criteria of maximizing the amount of information regarding the location of WAG client 24 involves selecting a satellite 12-j that, when detected, will indicate an area in the sector where WAG client 24 is located. For example, a satellite 12-j with a small elevation angle $a_j$, when detected, will indicate a narrow strait in the sector where WAG client is located, whereas a satellite 12-j with a large elevation angle $\alpha_j$ will indicate a wider strait in the sector where WAG client is located.

Upon selecting a first satellite 12-j to be searched, in step 620, WAG client 24 determines an integration time period for correlators 16-k at which to search for the first satellite 12-j, wherein the integration time period will depend upon the received signal strength measurements at WAG client 24 (or server 22 ) of signals 11-j transmitted by the first or any satellite 12-j.

In one embodiment, WAG client 24 measures the signal strength of signals transmitted on or about frequency $f+\Delta f_j$ as indicated in the search message for the first satellite 12-j. In another embodiment, WAG client measures the signal strength of signals transmitted on frequency f.

The integration time periods vary inversely, either proportionally or non-proportionally, to the signal strength measurements of signals 11-j. For example, if the received signal strength measurements of signals 11-j increase, the integration time periods for correlators 16-k decrease. In one embodiment, if the received signal strength measurements of signals 11-j at WAG client 24 is below a threshold value, the integration time period is maximized, and vice-versa. For example, if WAG client 24 measures the strength of signals 11-j to be below the threshold value, the integration time period of correlators 16-k is set to 1 second, whereas if WAG client 24 measures the strength of signals 11-j to be above or equal to the threshold value, the integration time period of correlators 16-k is set to 1 millisecond.

Figure 7:
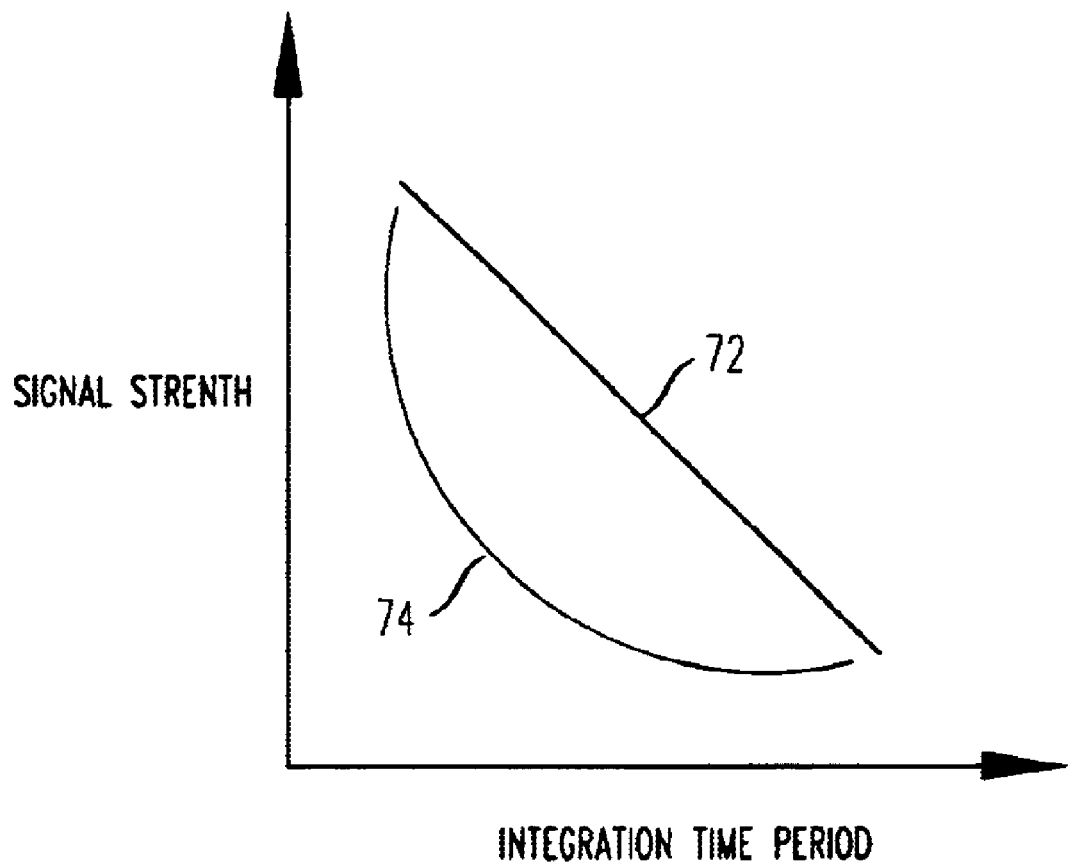
FIG. 7 depicts a chart illustrating two curves that may be used for determining integration time periods.

In another embodiment, there are multiple threshold values and integration time periods for correlators 16-k. Suppose there are two threshold values and three durations of integration time periods. If the signal strength is below the lowest threshold value, the integration time period is set to shortest duration; if the signal strength is above the lowest threshold value but below the highest threshold value, the integration time period is set to second shortest or second longest duration; and if the signal strength is above the highest threshold value, the integration time period is set to longest duration. In other embodiments, the integration time periods are determined according to the received signal strengths and a curve or mathematical equation. See FIG. 7, which depicts a chart 70 illustrating two possible relationships between received signal strength measurements and integration time periods.

Figure 8:
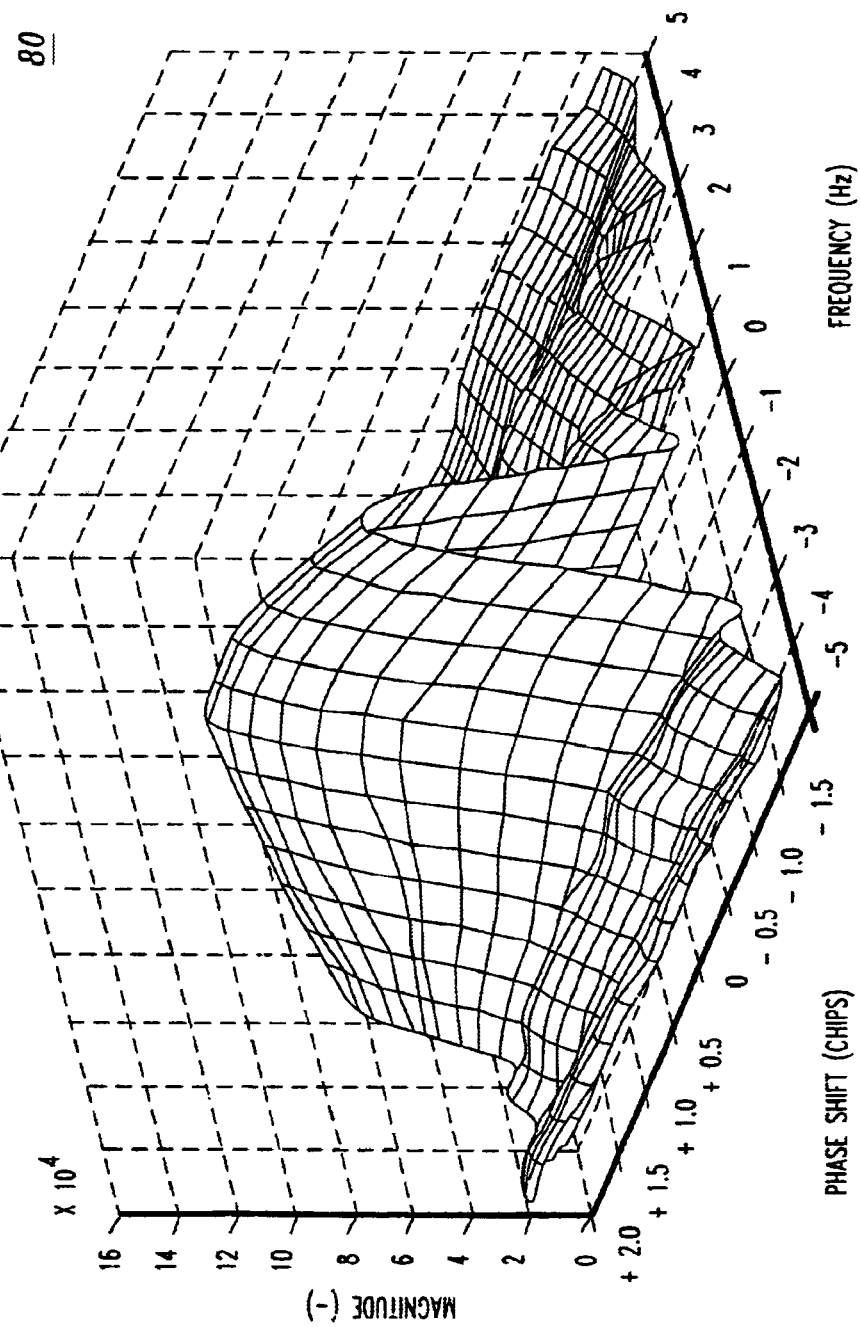
FIG. 8 depicts a sample power spectrum density of auto correlation for eight correlators spaced half a chip period apart.

In yet another embodiment, relative signal strengths are used to determine whether GPS receiver 14 is indoors or outdoors which, in turn, determines the integration time periods. For example, suppose GPS receiver 14 has eight correlators which are spaced half a chip period apart. Each correlators samples or measures signal strengths (for a particular signal 11-j or PN-j sequence) every millisecond over a twenty millisecond time period, i.e., each correlator perform twenty samples. For each set of samples collected by a correlator, a Fourier transform is applied to obtain a power spectrum density of auto correlation for each correlator. FIG. 8 depicts a three dimensional chart 80 illustrating a possible power spectrum density of auto correlation for eight correlators spaced half a chip period apart. A maximum power spectrum density value over all the correlators ($P_{max}$)

is divided over an average power spectrum density value ($P_{avg}$) over all the correlators to obtain a power spectrum density ratio ($P_{ratio}$).

$$\frac{P_{max}}{P_{avg}} = P_{ratio}$$

The power spectrum density ratio $P_{ratio}$ is then compared to a threshold value to determined integration time periods. Basically, a small $P_{ratio}$ would indicate that GPS receiver 14 is indoors, whereas a large or larger $P_{ratio}$ would indicate that GPS receiver 14 is outdoors. Specifically, when GPS receiver 14 is indoors, more multi-path signals are present resulting in a wider distribution of a signal's energy. Thus, $P_{max}$ should not be much greater than $P_{avg\ and}\ P_{ratio}$ should be a small value (e.g., a value greater than but close to one). By contrast, when GPS receiver 14 is outdoors, less multi-path signals are present resulting in more of a concentration of a signal's energy onto a single signal. Thus, $P_{max}$ should be much greater than $P_{avg\ and}\ P_{ratio}$ should be a large or larger value (e.g., a value greater than and not close to one).

In step 625, WAG client 24 searches for the first satellite 12-$j$ for the determined integration time period using the frequency $f_j(r)$ and code phase search range $R_j$(sect) indicated in the search message for the first satellite 12-$j$. Once the first satellite 12-$j$ has been detected, in step 630, WAG client 24 predicts a first area in which WAG client 24 may be located using information extracted from a GPS signal 11-$j$ transmitted by the first satellite 12-$j$, as is well-known in the art. The first predicted area typically being a strait or small area within the sector where WAG client 24 is currently located. Such calculation is later used to narrow down the code phase search range $R_j$ of subsequent satellite searches.

In step 640, WAG client 24 uses the search message to pick a second satellite 12-$j$ to search. WAG client 24 uses one or more criteria in a set of second satellite selection criteria to select the second satellite 12-$j$. In one embodiment, the set of second satellite selection criteria are as follows: (1) maximize utilization of correlators; (2) minimize search time; and (3) maximize the amount of additional information regarding location of WAG client 24 (or GPS receiver 14 or antenna 15) when used in conjunction with the results of the first search. The first and second criteria being identical to the first and second criteria of step 610. The third criteria involves selecting a second satellite 12-$j$ that will result in an area which intersects least, but nevertheless intersects, with the first predicted area. In one embodiment, the second satellite 12-$j$ selected is a satellite 12-$j$ that forms an angle of approximately 90° with the first satellite and WAG server 22 or WAG client 24, wherein WAG server 22 or WAG client 24 is the vertex. The angle between the fist and second satellites and WAG server 22 or client 24 can be determined using a difference between azimuth angles associated with the fist and second satellites.

In step 645, WAG client 24 redefines or narrows down the code phase search range $R_j$(sect) indicated in the search message for the second satellite 12-$j$ based on the first predicted area. The redefined or narrowed down code phase search range $R_j$(sect) is hereinafter referred to as a "predicted code phase search range $R_j$(pred)." The predicted code phase search range $R_j$(pred) for the second satellite includes all possible phase shifts for GPS signals 11-$j$ transmitted by the second satellite and arriving in the first predicted area. Since the first predicted area is a strait or small area within the sector where WAG client 24 is currently located, the corresponding predicted code phase search range $R_j$(pred) will be narrower than the corresponding code phase search range $R_j$(sect) originally indicated in the search message for the second satellite.

In step 648, WAG client 24 determines an integration time period for correlators 16-$k$ at which to search for the second satellite 12-$j$ based on received signal strength measurements. As in step 620, WAG client 24 can either measure the signal strength of signals transmitted on or about frequency f+$\Delta f_j$ as indicated in the search message for the second satellite 12-$j$ or on frequency f. In step 650, WAG client 24 searches for the second satellite 12-$j$, for the integration time period determined in step 638, using the frequency $f_j(r)$ indicated in the search message and the predicted code phase search range $R_j$(pred) for the second satellite 12-$j$. In another embodiment, the integration time period may be re-determined prior to step 650. Once the second satellite 12-$j$ has been detected, in step 655, WAG client 24 predicts a second area in which WAG client 24 may be located using information extracted from a GPS signal 11-$j$ transmitted by the second satellite 12-$j$. Like the first predicted area, the second predicted area is typically a strait or small area within the sector in which WAG client 24 is currently located.

The intersection of the first and second predicted areas effectively reduces the size of the search area in which WAG client 24 may be located. In step 660, WAG client 24 uses the intersected area and the code phase search range $R_j$(sect) indicated in the search message to predict code phase search range $R_j$(pred) for the remaining satellites 12-$j$ indicated in the search message, thereby facilitating detection of the remaining satellites 12-$j$. Such predicted code phase search ranges $R_j$(pred) include code phases for GPS signals 11-$j$ transmitted by the remaining satellites indicated in the search message and arriving anywhere within the intersected area.

In step 665, WAG client 24 determines integration time periods for correlators 16-$k$ at which to search for the remaining satellite 12-$j$ (i.e., all other satellites 12-$j$ indicated in the search message other than the first and second satellites) based on received signal strength measurements. As in step 620, WAG client 24 can either measure the sign strength of signals transmitted on or about frequency f+$\Delta f_j$ as indicated in the search message for the remaining satellites 12-$j$ or on frequency f. In step 670, WAG client 24 searches for the remaining satellites 12-$j$, for the integration time period determined in step 665, within the confines of the predicted code phase search ranges $R_j$(pred) for the remaining satellites 12-$j$. In an embodiment of the present invention, WAG client 24 uses its correlators to perform parallel searches for two or more remaining satellites 12-$j$. Upon detecting the remaining satellites 12-$j$, in step 680, WAG client 24 calculates its location using the navigation data ND-$j$ extracted from GPS signals 11-$j$ transmitted by at least three satellites 11-$j$, as is well-known in the art.

The present invention is described herein with reference to certain embodiments, including an embodiment in which the first, second and all or some of the remaining satellites are searched sequentially. Other embodiments are possible. For example, the sequential search of the present invention may involve GPS receiver 28 searching in parallel for the first and second satellites, and then searching in parallel for all or some of the remaining satellites. The present invention is also applicable to non-GPS satellite-based or non-satellite-based navigation system. Accordingly, the present invention should not be limited to the embodiments disclosed herein.

We claim:

1. A method for detecting a plurality of signals comprising the steps of:
   measuring a strength of signals being transmitted on a frequency associated with a signal to be detected;
   determining an integration time period for performing a coherent integration based on the measured strength of signals; and
   searching for the signal to be detected using a correlator for the determined integration time period,
   wherein the step of determining the integration time period include the step of determining a power spectrum density ratio by measuring samples over a twenty millisecond time period, wherein the power spectrum density ratio is used to determine the integration time period.

2. The method of claim 1, wherein the integration time period is determined in a manner inverse to the measured strength of signals.

3. The method of claim 1, wherein the integration time period is determined using a curve.

4. The method of claim 1, wherein the integration time period is determined using a mathematical equation.

5. The method of claim 1, wherein the integration time period is maximized if the measured strength of signals is below a threshold value.

6. The method of claim 5, wherein the integration time period is minimized if the measured strength of signals is above or equal to a threshold value.

7. The method of claim 1, wherein the frequency is an estimated frequency for the signal to be detected.

8. The method of claim 7, wherein the estimated frequency is based on a reference point within a sector in which a receiver is located.

9. The method of claim 1 comprising the additional step of:
   receiving a search message indicating the frequency associated with the signal to be detected.

10. The method of claim 1, wherein the frequency is a frequency at which the signal to be detected was transmitted.

11. The method of claim 1 comprising the additional steps of:
    measuring a strength of signals being transmitted on a frequency associated with a second signal to be detected;
    determining a second integration time period based on the measured strength of signals; and
    searching for the second signal to be detected using a correlator for the determined second integration time period.

12. The method of claim 1, wherein a long integration time period is determined if the power spectrum density ratio is small.

13. The method of claim 1, wherein a short integration time period is determined if the power spectrum density ratio is large.

* * * * *